DE WITT C. BAILEY.
HOSE COUPLING.
APPLICATION FILED OCT. 26, 1912.
1,195,433.
Patented Aug. 22, 1916.
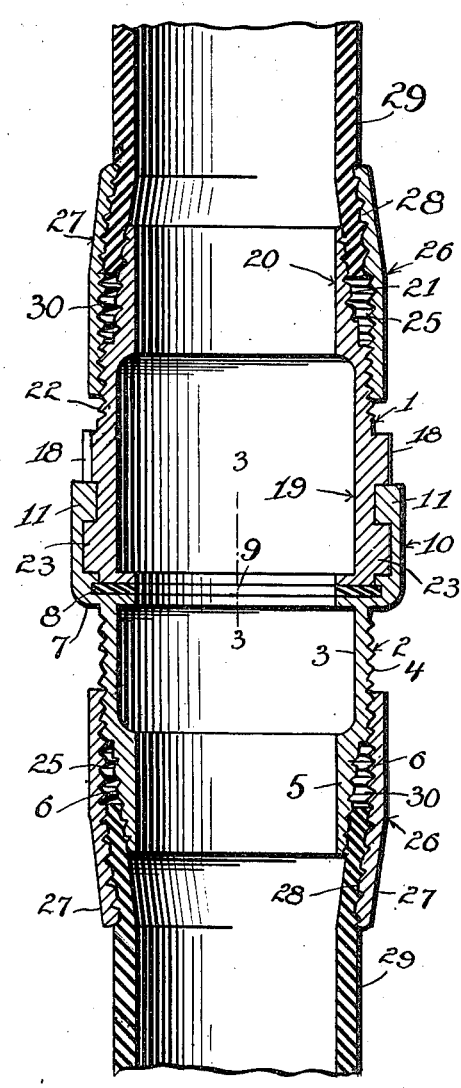
Fig. 1.
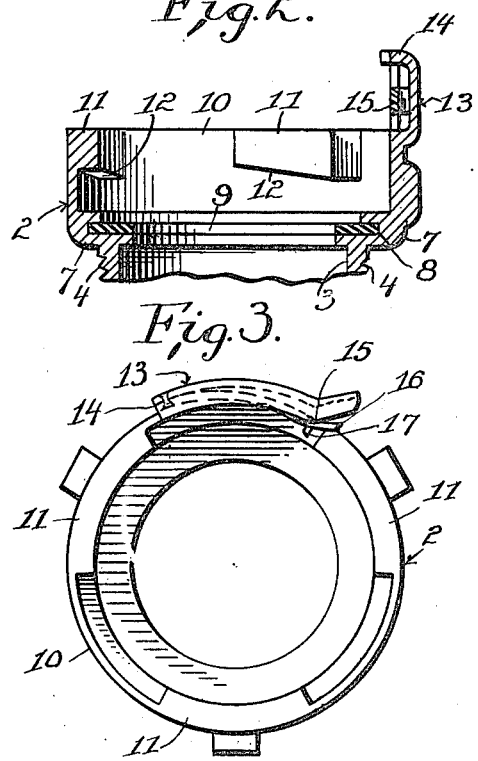
Fig. 2.
Fig. 3.
Fig. 4.
Witnesses
Inventor
D. C. Bailey.
By
Attorneys

UNITED STATES PATENT OFFICE.

DE WITT C. BAILEY, OF NICHOLS, FLORIDA.

HOSE-COUPLING.

1,195,433.  Specification of Letters Patent.  Patented Aug. 22, 1916.

Original application filed April 27, 1912, Serial No. 693,678. Divided and this application filed October 26, 1912. Serial No. 727,866.

*To all whom it may concern:*

Be it known that I, DE WITT C. BAILEY, a citizen of the United States, residing at Nichols, in the county of Polk, State of Florida, have invented certain new and useful Improvements in Hose-Couplings; and I do hereby declare the following to be a full, clear, and exact description of the invention, such as will enable others skilled in the art to which it appertains to make and use the same.

The present invention relates to improvements in couplings for fire hose, and is a division of an application filed Apr. 27, 1912, Serial No. 693,678, which has become Patent No. 1,143,020, June 15, 1915.

The invention has for its object to so construct a coupling of this character that the sections may be easily and quickly coupled.

A further object of the invention is to provide a novel means of securing the ends of the hose to the male and female members of the coupling.

With these and other objects in view, this invention resides in the novel features of construction, formation, combinations and arrangements of parts to be hereinafter more fully described, claimed and illustrated in the accompanying drawing, in which:—

Figure 1 is a longitudinal sectional view through the coupling. Fig. 2 is an elevation of the male member. Fig. 3 is a sectional view on line 3—3 of Fig. 1. Fig. 4 is a top plan view of the female member.

Referring to the drawing, the numerals 1 and 2 designate the male and female members, respectively. The female member 2 consists of a tubular section 3, the outer surface of which is formed with threads 4. Formed integral with the tubular section 3 is a reduced extension 5, the same being formed upon its outer surface with spirally arranged ribs 6, the pitch thereof being the same as the threads 4. The upper end of the tubular section 3 terminates in a shoulder 7, which is formed interiorly with an annular groove 8, which serves to retain a rubber gasket 9 in place. The shoulder 7 terminates in an annular flange 10 which is formed internally with projecting lugs 11, said lugs being spaced an equal distance apart, and have their lower edges inclined, as at 12, the purpose of which will appear later. Formed integrally with the flange 10 is a projected curved plate 13 having its outer edge provided with an inturned flange 14. Rigidly connected at one end to the inner surface of the plate 13 is a resilient finger 15, the free end of which being formed with a head 16 having struck inwardly therefrom a tooth 17, said tooth being adapted to engage the series of annularly arranged ratchet teeth 18 formed upon the tubular section 19 of the male member 1. The male member 1 further consists of a reduced extension 20, which is formed exteriorly with spirally arranged threads 21, there being less threads 21 to the inch than there are threads 22 which latter are also formed upon the male member 1.

Formed near the end of the tubular portion 19 of the male member 1 is a plurality of spaced outwardly projecting lugs 23, said lugs having certain of their edges inclined, as at 24, said inclined edges being adapted to contact with the inclined edges 12 of the lugs 11 formed with the female member, thus limiting the relative rotation of the male and female members, and at the same time forcing the edge of the male member 1 in tight engagement with the gasket 9 carried by the female member, thus insuring a water tight joint at this point.

Adapted to engage the threads 4 and threads 22 of the respective members are the internal threads 25 of the clamping sleeves 26, each of which have their outer ends slightly tapered as at 27, said outer ends being formed with spirally arranged interior ribs 28, said ribs 28 being pitched left, and the threads 25 being pitched right so that when the ends of the hose 29 are inserted in the space 30 the same will have the tendency to be drawn inwardly when the clamping sleeves 26 are rotated, thus firmly holding the hose against accidental displacement.

When it is desired to uncouple the members it is only necessary that pressure be applied to the head 16 of the spring finger 15, thereby disengaging the tooth 17 from the ratchet teeth 18, whereupon the members may be rotated until the lugs 11 and 23 clear each other, and at which time the members may be uncoupled. It will be further noted that when the members are in their coupled position, the spring finger 15, owing to its engagement with the ratchet teeth will prevent accidental displacement with the members.

By providing the male and female members with the threaded portions 4 and 22, either one may be screwed into a fire plug upon removal of one of the clamping sleeves 26.

As hereinbefore stated there are more threads 22 to the inch than there are threads 21 and thus it will be noted that as the clamping member 26 is turned on the threads 22, the threads 28 will at times drag over the threads 21. When the threads 28 drag over the threads 21, the hose is alternately compressed and released, depending upon whether the corresponding portion of the hose is between the two opposed threads of the connected clamping member or whether it is between a thread and a groove. When the clamping member 26 is unscrewed a corresponding action takes place as the material of the hose is alternately compressed and released by the threads 28 and 21 as they drag over each other. Thus while the yieldable nature of the hose permits the clamping member to be unscrewed when force is applied, yet, the resistance of the hose owing to its compression above referred to, retards the unscrewing of the clamp 26 to such a degree that its accidental unscrewing under working conditions is prevented.

It is obvious that the member 20 being integral with the member 19 after the clamp 26 is in place, it will be prevented from being accidentally displaced as the hose will in fact form a lock to lock the members 20 and 26 together.

What is claimed is:—

The combination with a hose, of a coupling member having a tapered exteriorly threaded end inserted in the hose and having a cylindrical exteriorly threaded portion integral with and directly adjacent to the tapered portion, there being more threads to the inch on the cylindrical portion than on the tapered portion and a clamping member including a cylindrical interiorly threaded portion engaged with the threads of the cylindrical portion of the first member and a tapered portion threaded interiorly, the tapered portion of the two members engaging respectively the inner and outer faces of the hose.

In testimony whereof, I affix my signature, in presence of two witnesses.

DE WITT C. BAILEY.

Witnesses:
C. E. BROWNE,
F. D. BRYAN.